United States Patent
Busch et al.

(10) Patent No.: US 10,971,003 B2
(45) Date of Patent: Apr. 6, 2021

(54) SYSTEMS AND METHODS FOR PREDICTING PEDESTRIAN BEHAVIOR

(71) Applicant: Ford Global Technologies, LLC, Dearborn, MI (US)

(72) Inventors: Leah Busch, Berkley, MI (US); Andrea Chowanic, West Bloomfield, MI (US); Jessamyn Smallenburg, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 171 days.

(21) Appl. No.: 16/261,173

(22) Filed: Jan. 29, 2019

(65) Prior Publication Data

US 2020/0242921 A1  Jul. 30, 2020

(51) Int. Cl.
*G08G 1/01* (2006.01)
*G08G 1/005* (2006.01)
(Continued)

(52) U.S. Cl.
CPC .......... *G08G 1/0141* (2013.01); *G08G 1/005* (2013.01); *G08G 1/012* (2013.01); *G08G 1/0129* (2013.01);
(Continued)

(58) Field of Classification Search
CPC ........ G08G 1/0141; G08G 1/005; G08G 1/04; G08G 1/0129; G08G 1/012; B60W 40/04;
(Continued)

(56) References Cited

U.S. PATENT DOCUMENTS 6,826,477 B2 * 11/2004 Ladetto ................. G01C 21/16
340/944
8,948,955 B2   2/2015 Zhu et al.
(Continued)

FOREIGN PATENT DOCUMENTS

JP    2016-207113 A    12/2016

OTHER PUBLICATIONS

Anderson, M., "The Demographics of Device Ownership," Pew Research Center Internet & Technology, Oct. 29, 2015 (4 pages). Retrieved from http://www.pewinternet.org/2015/10/29/technology-device-ownership-2015/.

(Continued)

*Primary Examiner* — Mary Cheung
(74) *Attorney, Agent, or Firm* — Brandon Hicks; Eversheds Sutherland (US) LLP (57) ABSTRACT

Exemplary embodiments described in this disclosure are generally directed to systems and methods for predicting a behavior of a pedestrian on the basis of a behavioral profile of the pedestrian. The behavioral profile may be generated in a personal communication device of the pedestrian (such as a smartphone) based on activities performed by the pedestrian such as walking on a sidewalk, stepping off the sidewalk to walk on a road, standing on a sidewalk waiting for a traffic light to change, stepping onto the road when waiting for a traffic light to change, and/or crossing a road when the traffic light is red. The behavioral profile may also be based on other factors such as a traffic citation, an accident report, a status of a driver's license, and/or physical characteristics of the pedestrian (age, gender, etc.).

16 Claims, 3 Drawing Sheets

(51) Int. Cl.
    *G08G 1/04*    (2006.01)
    *B60W 40/04*   (2006.01)
    *G05D 1/02*    (2020.01)
(52) U.S. Cl.
    CPC ............... *G08G 1/04* (2013.01); *B60W 40/04* (2013.01); *G05D 1/0231* (2013.01); *G05D 1/0276* (2013.01); *G05D 2201/0213* (2013.01)
(58) Field of Classification Search
    CPC ............... G05D 1/0276; G05D 1/0231; G05D 2201/0213
    See application file for complete search history.

(56) References Cited

U.S. PATENT DOCUMENTS

| | | | |
|---|---|---|---|
| 9,483,948 B1* | 11/2016 | Gordon | G01S 13/931 |
| 9,604,639 B2 | 3/2017 | Laur et al. | |
| 9,881,503 B1* | 1/2018 | Goldman-Shenhar | G05D 1/0088 |
| 2015/0091740 A1* | 4/2015 | Bai | B60Q 9/008 340/901 |
| 2017/0057497 A1* | 3/2017 | Laur | G06K 9/00805 |
| 2017/0329332 A1* | 11/2017 | Pilarski | B60W 30/0956 |
| 2018/0257660 A1 | 9/2018 | Ibrahim et al. | |
| 2019/0005820 A1* | 1/2019 | Bansal | B60W 30/16 |
| 2019/0108753 A1* | 4/2019 | Kaiser | G08G 1/0129 |
| 2019/0189013 A1* | 6/2019 | Kim | G01M 17/007 |
| 2020/0043326 A1* | 2/2020 | Tao | B60R 11/04 |

OTHER PUBLICATIONS

Cefkin, M., "Towards Socially Acceptable Autonomous Driving," Nissan Research Center (13 pages). https://wardsauto.informa.com/wp-content/uploads/morning-center-stage-nissan-cefkin.pdf.
"Human Behavior is 93% Predictable, Research Shows." Northeastern University College of Science. Feb. 19, 2010 (4 pages). Retrieved from https://cos.northeastern.edu/news/human-behavior-is-93-predictable-research-shows/.
Kotseruba, et al., "Joint Attention in Autonomous Driving (JAAD)," Apr. 24, 2017 (10 pages). Retrieved from https://arxiv.org/pdf/1609.04741.pdf.

* cited by examiner

SYSTEMS AND METHODS FOR PREDICTING PEDESTRIAN BEHAVIOR

FIELD OF THE DISCLOSURE

This disclosure generally relates to predicting pedestrian behavior, and more particularly relates to predicting pedestrian behavior by a computer in an autonomous vehicle.

BACKGROUND

Conventional taxi services offered through vehicles such as cars, shuttle buses, and limousines have been supplemented recently by ridesharing services such as Uber™ and Lyft™. Most of the automobiles used for providing these ridesharing services are currently driven by human drivers. However, self-driven vehicles, also referred to as autonomous vehicles, have become the focus of a number of development efforts lately, and various ride service companies as well as other entities are considering replacing human drivers with autonomous vehicles. There are several aspects that have to be taken into consideration when doing so. For example, some humans are better drivers than others, and it is desirable to evaluate the use of an autonomous vehicle keeping in mind various qualities associated with good drivers. However, even a good driver may encounter a situation where a pedestrian (or a driver of another vehicle) may do something unexpected that can lead to an accident. The good driver may take preemptive action based on automatically predicting, or immediately responding to, a pedestrian's behavior, (or to the behavior of another vehicle driver). It is desirable that developmental efforts for autonomous vehicles include evaluation of capabilities such as behavior prediction and appropriate and quick responsiveness that in many cases are natural and inherent to human drivers.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and terms are used herein solely for convenience and such words and terms should be interpreted as referring to various objects and actions that are generally understood in various forms and equivalencies by persons of ordinary skill in the art. For example, the word "pedestrian" as used herein refers to any human being who is located outside an automobile either on foot or on any kind of personal transportation device such as, for example, a bicycle, a wheelchair, a skateboard, a hoverboard, or a scooter. The pedestrian may be moving or may be stationary over various periods of time at various places when the predicting pedestrian behavior system is in operation. When moving, the pedestrian may be performing activities such as walking, running, jogging, or bicycling. When stationary, the pedestrian may be performing activities such as standing near a road or standing at a spot that is located away from a road prior to, or during, walking, running, jogging, or bicycling. The phrase "walking characteristic" as used herein encompasses characteristics associated with various actions performed by a pedestrian such as walking, running, jogging, stopping abruptly while walking, jogging in place during a run, changing gait, and/or changing direction. The phrase "behavioral characteristic" as used herein refers to various types of behaviors of a person such as whether the person obeys rules all the time, some of the time, or rarely. Furthermore, it should be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

In terms of a general overview, certain embodiments described in this disclosure are directed to systems and methods for predicting behavior of a pedestrian on the basis of a behavioral profile of the pedestrian. The behavioral profile may be generated in a personal communication device of the pedestrian (a smartphone, for example) based on various activities performed by the pedestrian and/or based on various types of data associated with the pedestrian. A few examples of activities performed by the pedestrian may include walking on a sidewalk, stepping off the sidewalk to walk on a road, standing on a sidewalk while waiting for a traffic light to change, stepping onto the road while waiting for a traffic light to change, and/or crossing a road when the traffic light is in a red state. The behavioral profile may also be based on data such as a traffic citation, an accident report, a status of a driver's license, and/or physical characteristics of the pedestrian (age, gender, etc.).

Figure 1:
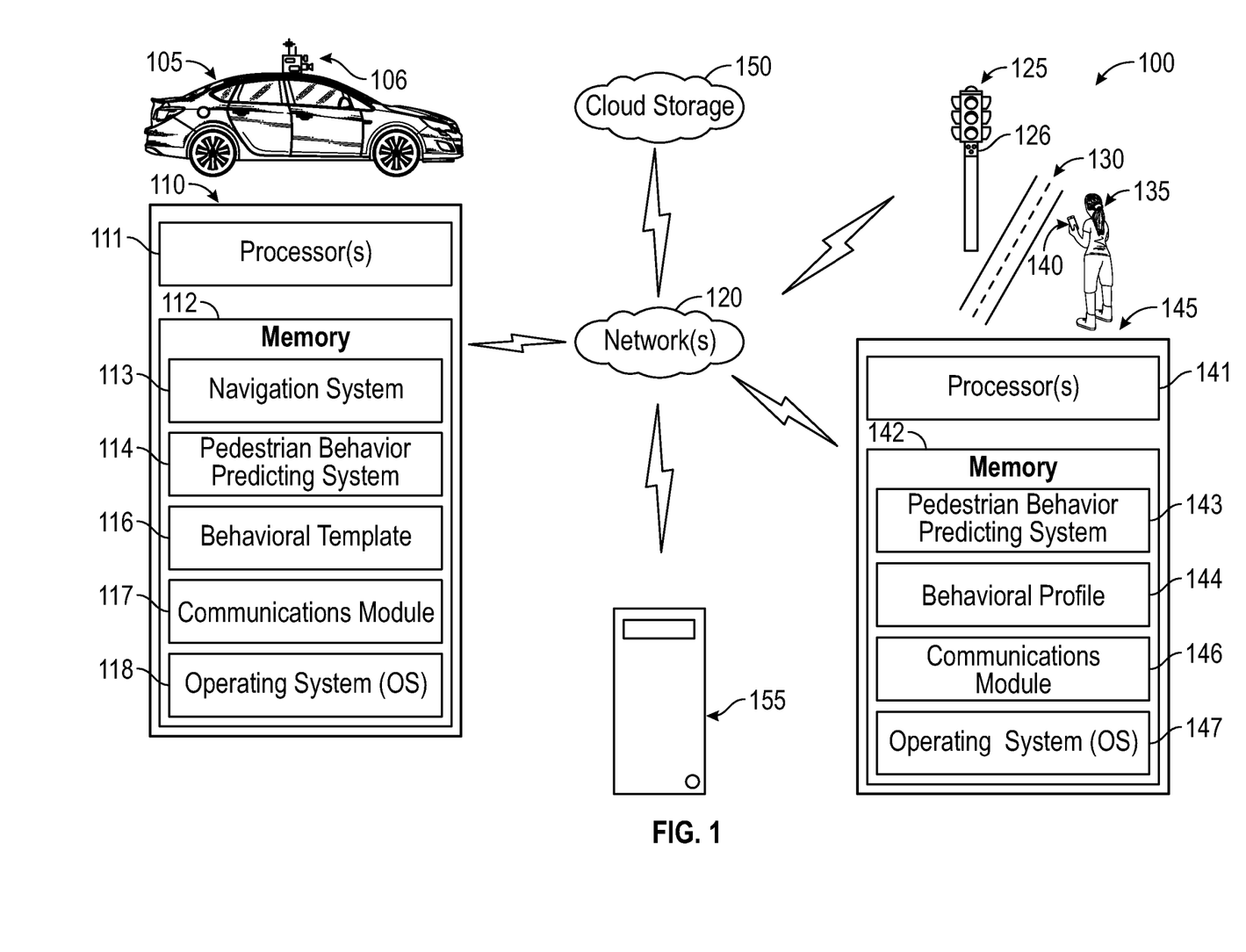
FIG. 1 shows an exemplary embodiment of a system for predicting pedestrian behavior in accordance with the disclosure.

FIG. 1 shows an exemplary system 100 for predicting pedestrian behavior in accordance with the disclosure. In this exemplary embodiment, the system 100 may include an automobile configured to use a behavioral profile of the pedestrian 135 to predict an upcoming behavior of the pedestrian 135. The automobile illustrated in this exemplary embodiment is an autonomous vehicle 105, and one example of an upcoming behavior of the pedestrian 135 involves the pedestrian 135 stepping onto a road 130 in the path of the autonomous vehicle 105 when a traffic signal light 125 is in a red state. The behavioral profile of the pedestrian 135 may be generated in various ways.

In one exemplary implementation, the autonomous vehicle 105 may use navigation assistance equipment 106 to detect a presence of the pedestrian 135. A transponder that may be part of the navigation assistance equipment 106 may then be used to communicate with a personal communication device 140 of the pedestrian 135 for obtaining data indicative of one or more behavioral characteristics of the pedestrian 135. The personal communication device 140 may be any of various devices such as, for example, a smartphone, a tablet computer, or a laptop computer. A computer system 110 that is located in the autonomous vehicle 105 and communicatively coupled to the navigation assistance equipment 106 may use this data to generate a behavioral profile of the pedestrian 135. In some instances, the behavioral profile of the pedestrian 135 may be generated using a combination of the data obtained from the personal communication device 140 of the pedestrian 135 and data obtained from other sources such as databases containing public records and monitoring devices (cameras at traffic intersections, for example).

In another exemplary implementation, the behavioral profile of the pedestrian 135 may be generated by a computer system 145 that is a part of the personal communication device 140, by using data contained in the personal communication device 140. The data provides information indicative of one or more behavioral characteristics of the pedestrian 135.

In yet another exemplary implementation, the behavioral profile of the pedestrian 135 may be generated by a server computer 155 that obtains data from the personal communication device 140. The server computer 155 may be operated by various entities such as a service provider or a corporation, for example. In some instances, the behavioral profile of the pedestrian 135 may be generated by the server computer 155 by using a combination of the data obtained from the personal communication device 140 of the pedestrian 135 and data obtained from other sources such as databases containing public records and monitoring devices (cameras at traffic intersections, for example). The behavioral profile of the pedestrian 135 may then be stored in cloud storage 150 for access by the autonomous vehicle 105 and other entities.

The data used to generate the behavioral profile of the pedestrian 135 may be contained in various items present in the personal communication device 140 such as, for example, one or more images (an image of a driver's license, for example), one or more documents, and/or a database. Information derived from such data for generating the behavioral profile of the pedestrian 135 may indicate, for example, an age of the pedestrian 135, a gender of the pedestrian 135, a marital status of the pedestrian 135, children of the pedestrian 135, a history of accidents (as indicated by one or more accident reports), a suspended driver's license, traffic citations, and/or jaywalking incidents.

In one exemplary implementation, the data used to generate the behavioral profile of the pedestrian 135 may be obtained by an operating system (OS) 147 of the computer system 145 that is a part of the personal communication device 140. The operating system (OS) 147 may access one or more applications running in the personal communication device 140, such as a mapping application or a Global Positioning System (GPS) application, to obtain data for generating the behavioral profile. The data obtained from the mapping application and/or the Global Positioning System (GPS) application may provide information indicative of various walking characteristics of the pedestrian 135. The walking characteristics of the pedestrian 135 may be determined, for example, by analyzing one or more routes traveled by the pedestrian 135. A traveled route may include a first portion that is a road surface and a second portion that is a sidewalk. The manner in which the pedestrian 135 transitions between the road surface and the sidewalk may indicate one of the behavioral characteristics of the pedestrian 135 such as whether the pedestrian 135 tends to obey rules.

The various computers of the system 100 may communicate with each other via a network 120. The network 120 may include any one or a combination of various networks such as a data network, a telephone network, a cellular network, a cable network, a wireless network, a private network, a public network, a local area network (LAN), a wide area network (WAN), and the Internet. In some instances, the network 120 may support communication technologies such as Bluetooth, cellular, near-field communication (NFC), Wi-Fi, and/or Wi-Fi direct.

One or more computers of the computer system 110 that is located in the autonomous vehicle 105 may include several components such as a processor 111 and a memory 112. The memory 112, which is one example of a non-transitory computer-readable medium, may be used to store the operating system (OS) 118 and various other code modules such as a navigation system 113, a pedestrian behavior predicting system 114, a behavioral template 116, and a communications module 117. The communications module 117 may be used by the autonomous vehicle 105 in cooperation with the transponder in the navigation assistance equipment 106 for communicating with various devices such as the personal communication device 140 of the pedestrian 135, the server computer 155, and/or storage elements of the cloud storage 150. The communications can be carried out in machine-to-machine form when the computer system 110 of the autonomous vehicle 105 is communicating with the personal communication device 140 of the pedestrian 135, the server computer 155, and/or elements of the cloud storage 150. In some exemplary implementations, the communications module 117 may be used by the autonomous vehicle 105 in cooperation with the transponder in the navigation assistance equipment 106 for communicating with the pedestrian 135 via the personal communication device 140. Communications between the computer system 110 and the pedestrian 135 may be carried out via machine-to-human communications (using a synthesized voice for example) and/or human-to-machine communications (voice-controlled applications).

The navigation system 113 may include one or more code modules that cooperate with various hardware components of the autonomous vehicle 105 for assisting the autonomous vehicle 105 to navigate around vehicles, pedestrians, and objects that may be encountered when driving down a road such as the road 130. A few examples of such hardware may include the navigation assistance equipment 106, a steering mechanism of the autonomous vehicle 105, an ignition switch of the autonomous vehicle 105, an accelerator of the autonomous vehicle 105, a braking mechanism of the autonomous vehicle 105, a door lock mechanism of the autonomous vehicle 105, and a Global Positioning System (GPS) system).

The navigation assistance equipment 106 can include various elements such as transponders, sensors, and imaging devices. A few example sensors that may be a part of the navigation assistance equipment 106 are motion detectors, distance sensors, proximity sensors, and audio sensors. A few example imaging devices that may be a part of the navigation assistance equipment 106 include a digital camera configured to capture digital images or a video camera configured to capture video footage.

The pedestrian behavior predicting system 114 may include one or more code modules that cooperate with hardware such as the navigation assistance equipment 106 for generating the behavioral profile of the pedestrian 135 by using data obtained from the personal communication device 140 of the pedestrian 135 and/or data from other sources. Some exemplary functions of the pedestrian behavior predicting system 114 may be understood from the various examples and descriptions provided in this disclosure.

The behavioral template 116 may be used by the pedestrian behavior predicting system 114 for predicting an upcoming behavior of the pedestrian 135 such as by comparing the behavioral profile of the pedestrian 135 against various thresholds and reference behaviors. The various thresholds and reference behaviors may be derived by processing behavioral profiles of a number of pedestrians. For example, a first reference behavior may be derived by processing behavioral profiles of various pedestrians whose actions have been monitored with respect to traffic signals. The first reference behavior may indicate that pedestrians at a first location (a first geographic location or country, for example) strictly abided by laws when at a traffic signal, and a second reference behavior may indicate that pedestrians at a second location (a second geographic location or country, for example) often ran across roads even when a traffic signal was in a red state. The first reference behavior stored in the behavioral template 116 may be characterized by the pedestrian behavior predicting system 114 as a first "typical" behavior by pedestrians at the first location, and this first "typical" behavior may be used by the pedestrian behavior predicting system 114 to predict an upcoming behavior of the pedestrian 135 when the pedestrian 135 is at the first location. The second reference behavior stored in the behavioral template 116 may be characterized by the pedestrian behavior predicting system 114 as a "typical" behavior by pedestrians at the second location, and this second "typical" behavior may be used by the pedestrian behavior predicting system 114 to predict an upcoming behavior of the pedestrian 135 when the pedestrian 135 is at the second location.

The personal communication device 140 of the pedestrian 135 may contain one or more computer systems such as the computer system 145 which includes several components such as a processor 141 and a memory 142. The memory 142, which is another example of a non-transitory computer-readable medium, may be used to store the operating system (OS) 147 and various other code modules such as a pedestrian behavior predicting system 143, a behavioral profile 144, and a communications module 146.

The communications module 146 may be used by the personal communication device 140 to communicate with various elements such as the autonomous vehicle 105. The communications may be carried out in machine-to-machine form when the personal communication device 140 is communicating with the computer system 110 of the autonomous vehicle 105.

The pedestrian behavior predicting system 143 may include one or more code modules that generate the behavioral profile of the pedestrian 135 by using data contained in the personal communication device 140 of the pedestrian 135 and/or data from other sources. Some exemplary functions of the pedestrian behavior predicting system 143 may be understood from the various examples and descriptions provided in this disclosure.

The behavioral profile 144 that is generated by the pedestrian behavior predicting system 143 may be stored in the memory 142 and made available for access by various entities such as the computer system 110 in the autonomous vehicle 105. In one exemplary implementation, access to the behavioral profile 144 by the various entities may be controlled by the pedestrian 135. Thus, for example, the pedestrian 135 may decide not to permit the autonomous vehicle 105 to obtain the behavioral profile 144, but may allow storage of the behavioral profile 144 in cloud storage 150.

The traffic signal light 125 may include an internet-enabled device 126 that is configured to communicate with other devices such as devices that are a part of the Internet-of-Things (IoT), as well as devices such as the personal communication device 140, which may or may not be a part of the Internet-of-Things (IoT). In one exemplary embodiment, the internet-enabled device 126 may be configured to obtain, from the personal communication device 140, data indicative of one or more behavioral characteristics of the pedestrian 135. The data may then be stored in a memory element (not shown) in the internet-enabled device 126, and/or transferred into cloud storage 150 for access by various entities such as the server computer 155 and/or the computer system 110 located in the autonomous vehicle 105. In another exemplary embodiment, the internet-enabled device 126 may use the data to generate a behavioral profile of the pedestrian 135. The behavioral profile may then be stored in a memory device in the internet-enabled device 126 and/or transferred into cloud storage 150 for access by various entities such as the server computer 155 and/or the computer system 110 located in the autonomous vehicle 105.

A memory device such as the memory 112 and the memory 142 shown in FIG. 1 can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semi-conductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, because the program can be electronically captured, for instance, via optical scanning of the paper or other medium, then compiled, interpreted or otherwise processed in a suitable manner if necessary, and then stored in a computer memory.

Figure 2:
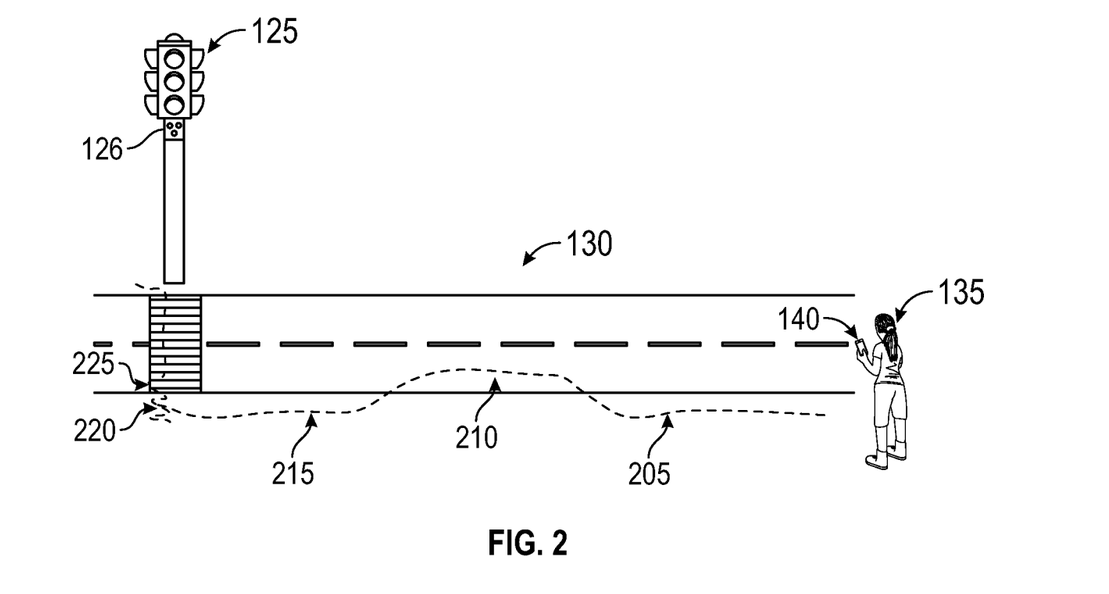
FIG. 2 illustrates an exemplary behavioral characteristic of a pedestrian in accordance with the disclosure.

FIG. 2 illustrates one exemplary behavioral characteristic of the pedestrian 135 in accordance with the disclosure. This exemplary behavioral characteristic pertains to a walking behavior of the pedestrian 135 when walking near the road 130. The walking behavior may be one sample among several samples that provides an indication of a typical behavior of the pedestrian 135 such as whether the pedestrian 135 follows road rules all the time, some of the time, or never. In the example illustration shown in FIG. 2, the pedestrian 135 walks on a sidewalk beside the road 130 during a first segment 205 of his walk. The pedestrian 135 then steps off the sidewalk and onto the road 130 during a second segment 210 of his walk. During a third segment 215, the pedestrian steps back onto the sidewalk prior to approaching a cross-walk in front of the traffic signal light 125. The pedestrian 135 paces around on the sidewalk during a fourth segment 220 while waiting for the traffic signal light 125 to turn green. The fifth segment 225 is indicative of the pedestrian 135 becoming impatient and stepping onto the road 130 even though the traffic signal light 125 is in a red state. The pedestrian 135 may then walk across the road 130 on the cross-walk when the traffic signal light 125 turns green. Alternatively, the pedestrian 135 may dart across the road 130 even though the traffic signal light 125 is still in the red state.

The exemplary behavioral characteristic of the pedestrian 135 may be recorded in the personal communication device 140 of the pedestrian 135 in various ways. For example, the recording may be carried out by using one or more sensors provided in the personal communication device 140, by a camera of the personal communication device 140, a mapping application executed in the personal communication device 140, and/or a Global Positioning System (GPS) system in the personal communication device 140.

Figure 3:
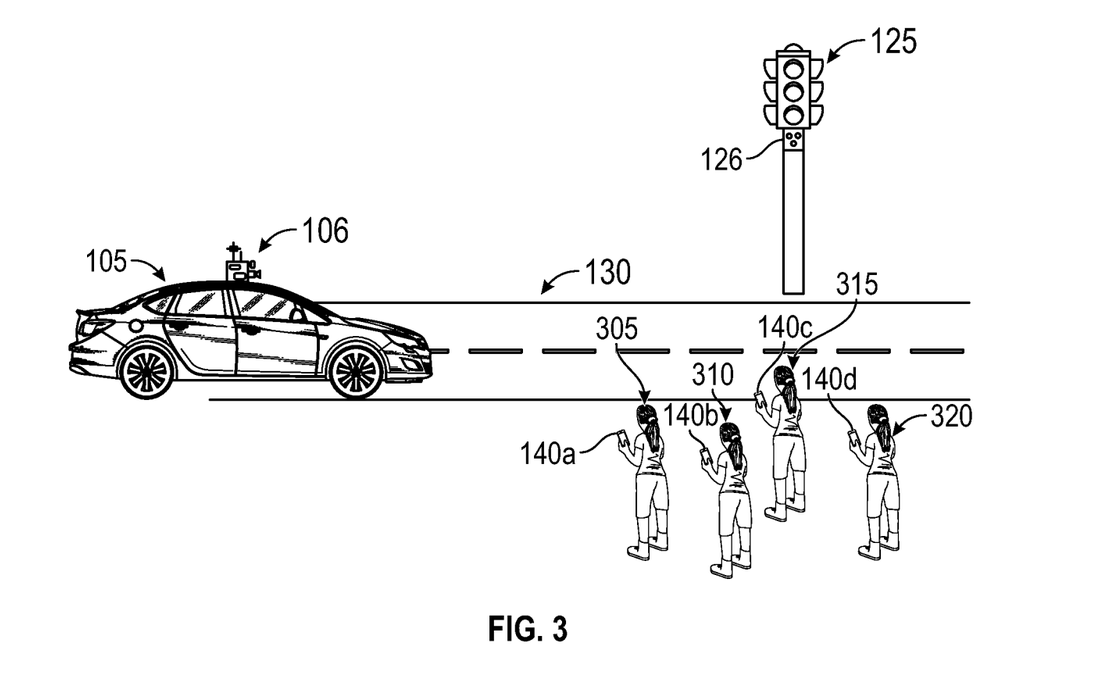
FIG. 3 illustrates an exemplary scenario wherein an exemplary system may be used to predict behavioral characteristics of a group of pedestrians in accordance with an embodiment the disclosure.

FIG. 3 illustrates an exemplary scenario wherein the system 100 may be used to predict an upcoming behavior of one or more of a group of pedestrians in accordance with an embodiment of the disclosure. In this exemplary scenario, the group of pedestrians includes a first pedestrian 305 carrying a personal communication device 140a, a second pedestrian 310 carrying a personal communication device 140b, a third pedestrian 315 carrying a personal communication device 140c, and a fourth pedestrian 320 carrying a personal communication device 140d. Any of various personal communication devices may be a smartphone, a tablet computer, or a laptop computer, for example.

Various components of the system 100 may be used for predicting an upcoming behavior of one or more pedestrians among the group of pedestrians. For example, the computer system 110 located in the autonomous vehicle 105 may obtain behavior profiles of the group of pedestrians (or data indicative of behavioral characteristics of each of the group of pedestrians) and predict an upcoming behavior of a specific individual in the group of pedestrians, a subset of pedestrians in the group of pedestrians, and/or the entire group of pedestrians.

In an exemplary implementation, the behavioral characteristics of one or more pedestrians of the group of pedestrians may be combined with other data obtained from other sources such as the internet-enabled device 126 and/or the server computer 155, to generate a behavioral profile of one or more pedestrians among the group of pedestrians. The behavioral profile may then be used by the autonomous vehicle 105, for example, to predict an upcoming behavior of a specific individual in the group of pedestrians, a subset of the group of pedestrians, and/or the entire group of pedestrians.

Figure 4:
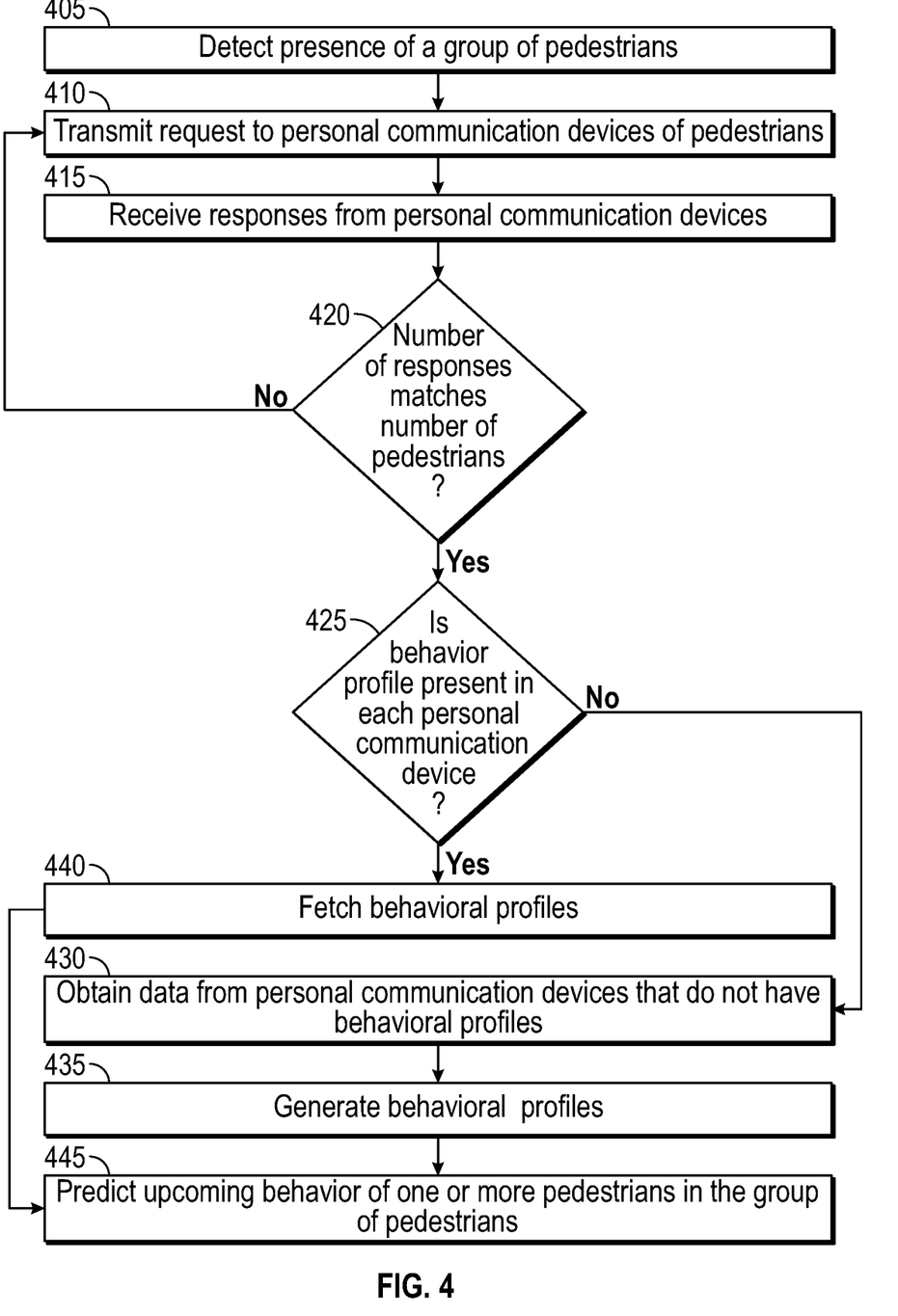
FIG. 4 shows a flowchart that illustrates an exemplary method for operating a system to predict pedestrian behavior in accordance with the disclosure.

FIG. 4 shows a flowchart 400 that illustrates an exemplary method for operating a system to predict pedestrian behavior in accordance with the disclosure. The method is applicable to predict an upcoming behavior of a single pedestrian and/or one or more pedestrians such as from among a group of pedestrians. The sequence of operations indicated in the flowchart 400 can be implemented in hardware, software, or a combination thereof. In the context of software, the operations represent computer-executable instructions stored on one or more non-transitory computer-readable media such as the memory 112 and/or the memory 142 that, when executed by one or more processors such as the processor 111 and/or the processor 141, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel.

The flowchart 400 is described below using the exemplary scenario shown in FIG. 3 but some or all of the operations indicated in the flowchart 400 may be equally applicable to many other scenarios, such as for example, where a single pedestrian is standing on a sidewalk at a spot where no traffic light is present. At block 405, the computer system 110 located in the autonomous vehicle 105 detects a presence of a group of pedestrians such as the group shown in FIG. 3. The detection may be carried out by using the navigation assistance equipment 106 of the autonomous vehicle 105. At block 410, the computer system 110 uses a transponder in the navigation assistance equipment 106 to transmit a request to the various personal communication devices carried by the pedestrians. In one example implementation, the request may be a global request that is received and recognized simultaneously by all the personal communication devices. Some or all of the personal communication devices may then respond to the global request by transmitting an acknowledgement to the global request. In another example implementation, the request is directed towards individual personal communication devices.

At block 415, the computer system 110 receives responses from some or all of the personal communication devices. At block 420, the computer system 110 determines if the number of responses received matches the number of pedestrians present in the group of pedestrians. In one exemplary implementation, the determination may be carried out by using one or more images captured by an imaging device in the navigation assistance equipment 106. If the number of responses received does not match the number of pedestrians, the operation indicated in block 410 may be repeated. In one example implementation, this operation may be carried out by sending out requests to only those personal communication devices that have not responded. On the other hand, if the number of responses received matches the number of requests sent out, the operation indicated in block 425 is carried out. In block 425, a determination is made on whether each of the personal communication devices that responded to the request has a behavioral profile. If for example, a first personal communication device carried by a first pedestrian does not contain a behavioral profile, in block 430, the computer system 110 communicates with the first personal communication device, and obtains data indicative of one or more behavior characteristics of the first pedestrian. In block 435, the computer system 110 generates a behavioral profile of the first pedestrian. In some cases, data obtained from the personal communication device of the first pedestrian, such as for example, an address of the first pedestrian and/or physical features of the first pedestrian, may be inadequate for use in generating a behavioral profile of the first pedestrian. The computer system 110 may then obtain additional data from one or more internet-enabled devices such as the internet-enabled device 126 mounted on the traffic signal light 125. The internet-enabled device 126 may provide data that indicates that the first pedestrian has, in the past, moved into the crosswalk occasionally, often, or never, when the traffic signal light 125 was in a yellow signal state. The internet-enabled device 126 may also provide data that indicates that the first pedestrian has, in the past, often crossed the road when the traffic signal light 125 was in a red signal state. The behavioral profile generated in accordance with block 435 may be used by the computer system 110 to predict an upcoming behavior of the first pedestrian. This operation is indicated in block 445. In some exemplary implementations, a confidence score may be associated with the prediction made in block 445.

If the determination made in block 425 indicates that each of the personal communication devices that responded to the request have behavioral profiles, in block 440, one or more of the behavioral profiles are fetched by the computer system 110. In block 445, the one or more behavioral profiles are used by the computer system 110 to predict an upcoming behavior of the respective pedestrians.

EXAMPLE EMBODIMENTS

In some instances, the following examples may be implemented together or separately by the systems and methods described herein.

Example 1 may include a method comprising: obtaining, by at least one computer located in an automobile, from a personal communication device of a first pedestrian, data indicative of at least a first behavioral characteristic of the first pedestrian; generating, by the at least one computer, a behavioral profile of the first pedestrian, based at least in part on the at least first behavioral characteristic of the first pedestrian; detecting, by a navigation assistance equipment located in the automobile, a presence of the first pedestrian outside the automobile; and predicting, by the at least one computer, an upcoming behavior of the first pedestrian, based at least in part on the behavioral profile of the first pedestrian.

Example 2 may include the method of example 1, wherein the data indicative of the at least first behavioral characteristic of the first pedestrian comprises at least one of an image, a document, a file, a database, or a recording.

Example 3 may include the method of example 2 and/or some other example herein, wherein the at least one of the image, the document, the file, the database, or the recording is indicative of at least one of an accident report, a suspended driver's license, a traffic citation, or a jaywalking incident.

Example 4 may include the method of example 2 and/or some other example herein, wherein the at least one of the image, the document, the file, the database, or the recording is indicative of a route traveled by the first pedestrian, the route comprising a first portion that is a road surface traveled by the first pedestrian and a second portion that is a sidewalk traveled by the first pedestrian.

Example 5 may include the method of example 1 and/or some other example herein, wherein the navigation assistance equipment includes an imaging device, and the method further comprises: capturing, by the imaging device, at least one image comprising the first pedestrian, a traffic signal light, and at least a portion of a road adjacent to the first pedestrian; determining, by the at least one computer, that the first pedestrian is one of standing on the road or crossing the road when the traffic signal light is in one of a red signal state or a yellow signal state; and generating, by the at least one computer, the behavioral profile of the first pedestrian, based at least in further part on the determination that the first pedestrian is one of standing on the road or crossing the road when the traffic signal light is in one of the red signal state or the yellow signal state.

Example 6 may include the method of example 5 and/or some other example herein, wherein predicting, by the at least one computer, the upcoming behavior of the first pedestrian, comprises predicting that the first pedestrian will step onto the road when the traffic signal light is in one of the red signal state or the yellow signal state.

Example 7 may include the method of example 1 and/or some other example herein, wherein the navigation assistance equipment includes a transponder configured to communicate with an internet-enabled device, and further comprising: obtaining from the internet-enabled device, by the at least one computer, utilizing the transponder, data indicative of at least a second behavioral characteristic of the first pedestrian; and generating, by the at least one computer, the behavioral profile of the first pedestrian, based at least in further part on the data indicative of the at least second behavioral characteristic of the first pedestrian.

Example 8 may include the method of example 7 and/or some other example herein, wherein the internet-enabled device is located in one of a pole of a traffic signal light, a lamp post, a sidewalk, or a utility pole, and wherein the internet-enabled device includes a sensor that senses the at least second behavioral characteristic of the first pedestrian.

Example 9 may include a method comprising: providing, in a personal communication device of a first pedestrian, data indicative of at least a first behavioral characteristic of the first pedestrian; and generating, by at least a first computer located in the personal communication device, a behavioral profile of the first pedestrian based at least in part on the first behavioral characteristic of the first pedestrian.

Example 10 may include the method of example 9, wherein the data indicative of the at least first behavioral characteristic of the first pedestrian is obtained by the personal communication device from an internet-enabled device.

Example 11 may include the method of example 10 and/or some other example herein, wherein: the first behavioral characteristic of the first pedestrian is a walking characteristic; the internet-enabled device includes a sensor that senses the walking characteristic of the first pedestrian; and the internet-enabled device is located in one of a pole of a traffic signal light, a lamp post, a sidewalk, or a utility pole.

Example 12 may include the method of example 9 and/or some other example herein, further comprising: transmitting the behavioral profile from the personal communication device to at least a second computer located in an automobile; and predicting, by the second computer located in the automobile, an upcoming behavior of the first pedestrian, based on the behavioral profile.

Example 13 may include the method of example 12 and/or some other example herein, wherein the personal communication device is a smartphone of the first pedestrian, and the automobile is an autonomous vehicle.

Example 14 may include the method of example 12 and/or some other example herein, wherein predicting, by the second computer, the upcoming behavior of the first pedestrian, comprises predicting that the first pedestrian will step onto a road when a traffic signal light is in one of a red signal state or a yellow signal state.

Example 15 may include the method of example 12 and/or some other example herein, wherein the first behavioral characteristic of the first pedestrian is based on one or more of the first pedestrian standing on a road, the first pedestrian standing on a sidewalk, the first pedestrian crossing the road, and a signal state of a traffic signal light when the first pedestrian is crossing the road.

Example 16 may include the method of example 9 and/or some other example herein, wherein the first behavioral characteristic of the first pedestrian is indicated in at least one of an image, a document, a file, a database, or a recording in the personal communication device.

Example 17 may include the method of example 16 and/or some other example herein, wherein the at least one of the image, the document, the file, the database, or the recording is indicative of an accident report, a suspended driver's license, a traffic citation, a jaywalking incident, or a route traveled by the first pedestrian.

Example 18 may include a system comprising: a navigation assistance equipment located in an automobile, the navigation assistance equipment comprising: a sensor configured to detect a presence of a first pedestrian outside the automobile; and a transponder configured to obtain from a personal communication device of the first pedestrian, data indicative of at least a first behavioral characteristic of the first pedestrian; and a computer system located in the automobile and communicatively coupled to the navigation assistance equipment, the computer system comprising: at least one memory that stores computer-executable instructions; and at least one processor configured to access the at least one memory and execute the computer-executable instructions to at least: receive, from the navigation assistance equipment, the data indicative of the at least first behavioral characteristic of the first pedestrian; generate a behavioral profile of the first pedestrian, based at least in part on the at least first behavioral characteristic of the first pedestrian; and predict an upcoming behavior of the first pedestrian, based on the behavioral profile.

Example 19 may include the system of example 18, wherein the first behavioral characteristic of the first pedestrian is based on one or more of the first pedestrian standing on a road, the first pedestrian standing on a sidewalk, the first pedestrian crossing the road, a signal state of a traffic signal light when the first pedestrian is crossing the road, and one or more physical features of the first pedestrian.

Example 20 may include the system of example 18 and/or some other example herein, wherein predicting the upcoming behavior of the first pedestrian comprises predicting that the first pedestrian will step onto a road when a traffic signal light is in one of a red signal state or a yellow signal state.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein.

An implementation of the devices, systems, and methods disclosed herein may communicate over a computer network. A "network" is defined as one or more data links that enable the transport of electronic data between computer systems and/or modules and/or other electronic devices. When data is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   obtaining, by at least one computer located in an automobile, from a personal communication device of a first pedestrian, data indicative of at least a first behavioral characteristic of the first pedestrian;
   generating, by the at least one computer, a behavioral profile of the first pedestrian, based at least in part on the at least first behavioral characteristic of the first pedestrian;
   detecting, by a navigation assistance equipment located in the automobile, a presence of the first pedestrian outside the automobile; and
   predicting, by the at least one computer, an upcoming behavior of the first pedestrian, based at least in part on the behavioral profile of the first pedestrian,
   wherein the data indicative of the at least first behavioral characteristic of the first pedestrian comprises at least one of an image, a document, a file, a database, or a recording, and
   wherein the at least one of the image, the document, the file, the database, or the recording is indicative of a route traveled by the first pedestrian, the route comprising a first portion that is a road surface traveled by the first pedestrian and a second portion that is a sidewalk traveled by the first pedestrian.

2. The method of claim 1, wherein the at least one of the image, the document, the file, the database, or the recording is indicative of at least one of an accident report, a suspended driver's license, a traffic citation, or a jaywalking incident.

3. The method of claim 1, wherein the navigation assistance equipment includes an imaging device, and the method further comprises:
   capturing, by the imaging device, at least one image comprising the first pedestrian, a traffic signal light, and at least a portion of a road adjacent to the first pedestrian;
   determining, by the at least one computer, that the first pedestrian is one of standing on the road or crossing the road when the traffic signal light is in one of a red signal state or a yellow signal state; and
   generating, by the at least one computer, the behavioral profile of the first pedestrian, based at least in further part on the determination that the first pedestrian is one of standing on the road or crossing the road when the traffic signal light is in one of the red signal state or the yellow signal state.

4. The method of claim 3, wherein predicting, by the at least one computer, the upcoming behavior of the first pedestrian, comprises predicting that the first pedestrian will step onto the road when the traffic signal light is in one of the red signal state or the yellow signal state.

5. The method of claim 1, wherein the navigation assistance equipment includes a transponder configured to communicate with an internet-enabled device, and further comprising:
   obtaining from the internet-enabled device, by the at least one computer, utilizing the transponder, data indicative of at least a second behavioral characteristic of the first pedestrian; and
   generating, by the at least one computer, the behavioral profile of the first pedestrian, based at least in further part on the data indicative of the at least second behavioral characteristic of the first pedestrian.

6. The method of claim 5, wherein the internet-enabled device is located in one of a pole of a traffic signal light, a lamp post, a sidewalk, or a utility pole, and wherein the internet-enabled device includes a sensor that senses the at least second behavioral characteristic of the first pedestrian.

7. A method comprising:
   providing, in a personal communication device of a first pedestrian, data indicative of at least a first behavioral characteristic of the first pedestrian; and
   generating, by at least a first computer located in the personal communication device, a behavioral profile of the first pedestrian based at least in part on the first behavioral characteristic of the first pedestrian;
   transmitting the behavioral profile from the personal communication device to at least a second computer located in an automobile; and
   predicting, by the second computer located in the automobile, an upcoming behavior of the first pedestrian, based on the behavioral profile,
   wherein predicting, by the second computer, the upcoming behavior of the first pedestrian, comprises predicting that the first pedestrian will step onto a road when a traffic signal light is in one of a red signal state or a yellow signal state.

8. The method of claim 7, wherein the data indicative of the at least first behavioral characteristic of the first pedestrian is obtained by the personal communication device from an internet-enabled device.

9. The method of claim 8, wherein:
   the first behavioral characteristic of the first pedestrian is a walking characteristic;
   the internet-enabled device includes a sensor that senses the walking characteristic of the first pedestrian; and
   the internet-enabled device is located in one of a pole of a traffic signal light, a lamp post, a sidewalk, or a utility pole.

10. The method of claim 7, wherein the personal communication device is a smartphone of the first pedestrian, and the automobile is an autonomous vehicle.

11. The method of claim 7, wherein the first behavioral characteristic of the first pedestrian is based on one or more of the first pedestrian standing on a road, the first pedestrian standing on a sidewalk, the first pedestrian crossing the road, and a signal state of a traffic signal light when the first pedestrian is crossing the road.

12. The method of claim 7, wherein the first behavioral characteristic of the first pedestrian is indicated in at least one of an image, a document, a file, a database, or a recording in the personal communication device.

13. The method of claim 12, wherein the at least one of the image, the document, the file, the database, or the recording is indicative of an accident report, a suspended driver's license, a traffic citation, a jaywalking incident, or a route traveled by the first pedestrian.

14. A system comprising:
   a navigation assistance equipment located in an automobile, the navigation assistance equipment comprising:
      a sensor configured to detect a presence of a first pedestrian outside the automobile; and
      a transponder configured to obtain from a personal communication device of the first pedestrian, data indicative of at least a first behavioral characteristic of the first pedestrian; and
   a computer system located in the automobile and communicatively coupled to the navigation assistance equipment, the computer system comprising:
      at least one memory that stores computer-executable instructions; and
      at least one processor configured to access the at least one memory and execute the computer-executable instructions to at least:
         receive, from the navigation assistance equipment, the data indicative of the at least first behavioral characteristic of the first pedestrian;
         generate a behavioral profile of the first pedestrian, based at least in part on the at least first behavioral characteristic of the first pedestrian; and
         predict an upcoming behavior of the first pedestrian, based on the behavioral profile,
         wherein predicting the upcoming behavior of the first pedestrian comprises predicting that the first pedestrian will step onto a road when a traffic signal light is in one of a red signal state or a yellow signal state.

15. The system of claim 14, wherein the first behavioral characteristic of the first pedestrian is based on one or more of the first pedestrian standing on a road, the first pedestrian standing on a sidewalk, the first pedestrian crossing the road, a signal state of a traffic signal light when the first pedestrian is crossing the road, and one or more physical features of the first pedestrian.

16. A method comprising:
   obtaining, by at least one computer located in an automobile, from a personal communication device of a first pedestrian, data indicative of at least a first behavioral characteristic of the first pedestrian;
   generating, by the at least one computer, a behavioral profile of the first pedestrian, based at least in part on the at least first behavioral characteristic of the first pedestrian;
   detecting, by a navigation assistance equipment located in the automobile, a presence of the first pedestrian outside the automobile; and
   predicting, by the at least one computer, an upcoming behavior of the first pedestrian, based at least in part on the behavioral profile of the first pedestrian,
   wherein the navigation assistance equipment includes an imaging device, and the method further comprises:
      capturing, by the imaging device, at least one image comprising the first pedestrian, a traffic signal light, and at least a portion of a road adjacent to the first pedestrian;
      determining, by the at least one computer, that the first pedestrian is one of standing on the road or crossing the road when the traffic signal light is in one of a red signal state or a yellow signal state; and
      generating, by the at least one computer, the behavioral profile of the first pedestrian, based at least in further part on the determination that the first pedestrian is one of standing on the road or crossing the road when the traffic signal light is in one of the red signal state or the yellow signal state.

* * * * *